United States Patent
Bodette et al.

(10) Patent No.: US 9,497,938 B1
(45) Date of Patent: Nov. 22, 2016

(54) RECEPTACLE FOR NESTING MATERIAL

(76) Inventors: Julie A. Bodette, Swanton, OH (US); Kimberly Buechner Fouse, Cold Spring, KY (US)

( * ) Notice: Subject to any disclaimer, the term of this patent is extended or adjusted under 35 U.S.C. 154(b) by 964 days.

(21) Appl. No.: 12/383,090

(22) Filed: Mar. 19, 2009

(51) Int. Cl.
*A01K 45/00* (2006.01)

(52) U.S. Cl.
CPC .................................. *A01K 45/00* (2013.01)

(58) Field of Classification Search
CPC ........................................................ A01K 45/00
USPC ............................................................ 119/346
See application file for complete search history.

(56) References Cited

U.S. PATENT DOCUMENTS

| | | | | |
|---|---|---|---|---|
| 3,399,650 | A | * | 9/1968 | Goodman .................. 119/51.03 |
| 3,948,220 | A | * | 4/1976 | Fiedler ....................... 119/51.03 |
| 5,165,363 | A | * | 11/1992 | McGinty ...................... 119/464 |
| 2008/0178819 | A1 | * | 7/2008 | Sia et al. ..................... 119/300 |

OTHER PUBLICATIONS

Jonathan Petre, "Five-star Tweetment", Mar. 15, 2009, Mail on Sunday, 1 ED p. 34.*
BirdForum, Transformer, "Nesting Material", Sep. 21, 2006, p. 2.*
http://owensinafrica.blogspot.com/2009/02/weaver-birds-of-east-africa.html 5 pages Owens in Africa: Weaver Birds of East Africa (Feb. 4, 2009).*
http://socyberty.com/activism/home-tweet-home-some-ingenious-building-techniques/ 18 pages Home Tweet Home: Some Ingenious Building Techniques, Mr.Ghaz (Dec. 20, 2009) p. 10, "Nests" photo copywrite 1995.*
http://www.cs.cmu.edu/afs/cs/academic/class/16741-s07/www/projects06/dineshproject.pdf 7 pages.*
http://elibrary.unm.edu/sora/Auk/v081n01/p0042-p0052.pdf 11 pages The Auk v.81 n. 01 p. 42-52 1964.*
Web Site www.socyberty.com/activism/home-tweet-home-some-ingenious-building-techniques/ pp. 4, 10.

* cited by examiner

*Primary Examiner* — Monica Williams
(74) *Attorney, Agent, or Firm* — Charles R. Wilson

(57) ABSTRACT

The present invention directed to nesting material for birds, and more particularly, to a receptacle containing nesting material for birds. In a preferred embodiment the receptacle comprises a plurality of windings forming a generally spherical structure. The structure is provided with tuffs of fleece type nesting material inserted inside the ball and between the windings, and extending outwardly there from.

2 Claims, 1 Drawing Sheet

U.S. Patent  Nov. 22, 2016  US 9,497,938 B1
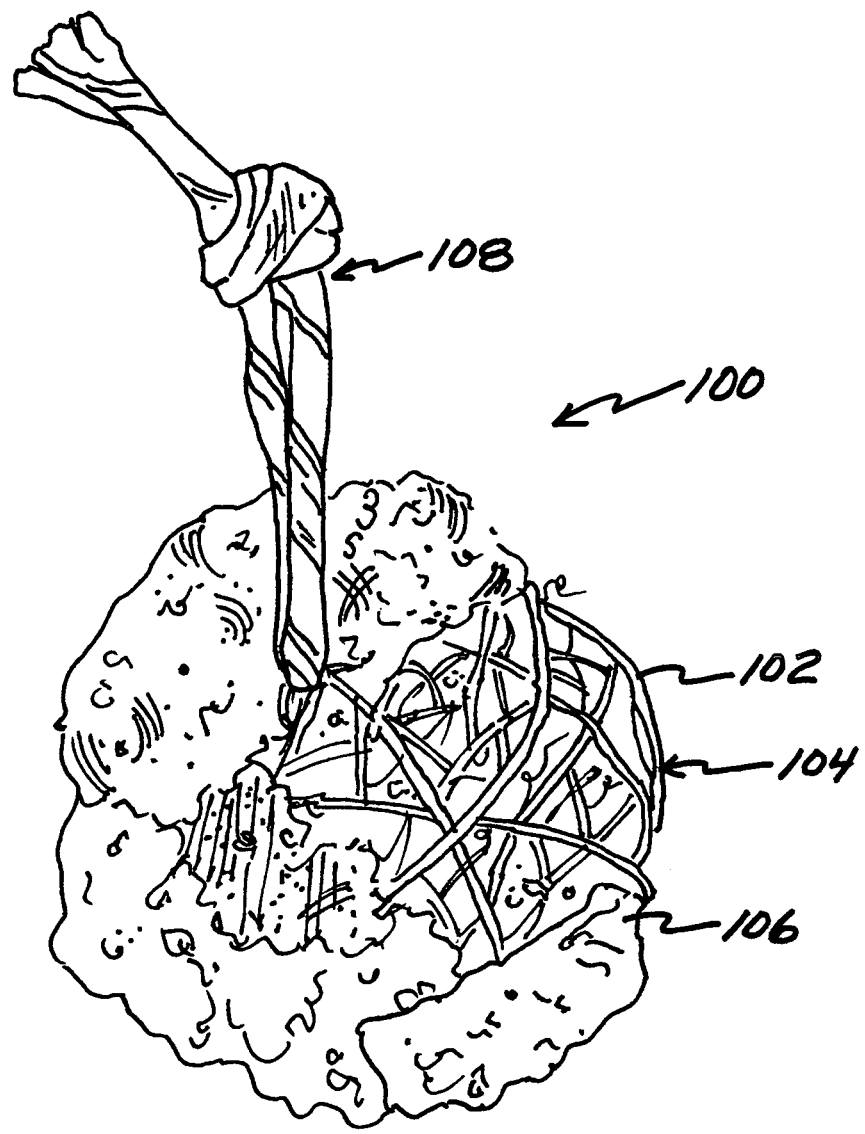

RECEPTACLE FOR NESTING MATERIAL

BACKGROUND OF THE INVENTION

The invention of the subject application is directed to nesting material for birds, and more particularly, to a receptacle containing nesting material for birds.

Most birds build some form of nest to lay and hatch their eggs. Such bird nests may be relatively simple structures, such as shallow depressions in the ground, or a hole in a tree. Other nests may be more elaborate and may be formed from twigs and other similar materials. Such nests are often lined with a relatively soft lining. Lining material have been known to include, leaves, feathers, straws, hair, fur, moss, pine needles, grass, and other natural material as well as fabric, plastic, string, paper, and other similar materials.

Bird feeders, bird baths and other structures have become popular to attract wild birds into garden areas. More recently, it has been found that providing sources of nesting material for wild birds has increased the likelihood that wild birds will nest in the vicinity of the nesting supply.

Accordingly, a need exists for a receptacle for nesting material for birds that permits nesting material to be easily removed from the receptacle, that has an attractive appearance, that is relatively inexpensive to produce, and is easily attached to a tree or other structure.

SUMMARY OF THE INVENTION

The invention of the subject application is directed to a receptacle for providing birds with nesting material. In a preferred embodiment of the invention the receptacle comprises a plurality of windings forming a generally spherical structure and nesting material deposited between the windings.

In another preferred embodiment of the invention the nesting material comprises alpaca fleece.

In another preferred embodiment of the invention the nesting material is of camouflaging colors.

In another preferred embodiment of the invention the windings comprises vine material.

In another preferred embodiment of the invention the vine material is grape vine.

Other objects and advantages of the invention will be apparent from the following description, the accompanying drawing, and the appended claims.

BRIEF DESCRIPTION OF THE DRAWINGS

To provide a more complete understanding of the present invention and further features and advantages thereof, reference is now made to the following description taken in conjunction with the accompanying drawing, in which:

FIG. 1 is a perspective view of a preferred embodiment of the invention showing the receptacle for nesting material for birds comprising a plurality of windings and nesting material inserted within and between the windings.

DETAILED DESCRIPTION OF THE INVENTION

The present invention directed to nesting material for birds, and more particularly, to a receptacle containing nesting material for birds. In a preferred embodiment the receptacle comprises a plurality of windings forming a generally spherical structure. The structure is provided with a fluff or fleece type nesting material inserted within and between the windings and extending outwardly there from. A detailed description of the receptacle is provided herein. In describing the preferred embodiments of the invention illustrated in the drawing, specific terminology will be resorted to for the sake of clarity. However, the invention is not intended to be limited to the specific terms so selected, and it is to be understood that each specific term includes all technical equivalents that operate in a similar manner to accomplish a similar purpose.

Although specific embodiments of the invention are heredescribed with references to the drawing, it should also be understood that these embodiments are simply illustrative examples of but a small number of the many possible specific embodiments which can represent applications of the principles of the invention. It should also be understood that the range of possible embodiments and variations, along with other changes and modifications that may be obvious to one skilled in the art to which the invention pertains, are deemed to be within the spirit, scope, and contemplation of the invention as further defined in the appended claims.

Referring to FIG. 1, a perspective view of the receptacle 100 is shown comprising a plurality of windings 102 forming a generally spherical structure 104. Deposited between the windings 102 is nesting material 106 such that a portion of the nesting material 106 is secured in place between the windings 102, such as by a friction fit, and a portion of the nesting material 106 extends outwardly from the structure 104. Attached to the structure 104 is a rope, or other such attachment means 108 for hanging the receptacle 100 freely from a building, tree, railing, or other outdoor structure such that it is accessible from all sides.

In a preferred embodiment of the invention, the windings 102 are formed from a natural material vine, such as hemp, bamboo, or grape vine, or other similar material vine or other suitable biodegradable material.

In a preferred embodiment of the invention, the nesting material 106 comprises feathers, straw, hair, fur, moss, pine needles, grass, and other natural material as well as fabric, plastic, string, paper, and other similar materials. In a preferred embodiment of the invention the nesting material 106 comprises alpaca fleece. It has been found that the alpaca fleece does not contain lanolin like other types of fleece, such as wool, and is therefore not sticky or tacky. In this way birds are able to extract the amount of nesting material needed for nesting. In another preferred embodiment of the invention the nesting material is camouflaged colored nesting material, such as various shades of brown, black, tans, and whites, to provide the bird's nest using such nesting material with camouflage for protection against predators.

It should now be apparent that the subject invention provides a receptacle for birds that permits nesting material to be easily inserted into and then removed from the receptacle by birds, that has an attractive appearance, that is relatively inexpensive to produce, that is biodegradable, and is easily attached to a tree or other structure. It should also now be apparent that the use of alpaca fleece, being a relatively fine fiber, makes the nesting material easy for birds to handle. Further, the windings forming the receptacle are aesthetically pleasing, provide a natural perch for birds, and are biodegradable.

We claim:

1. A receptacle for providing birds with nesting materials for building a nest, said receptacle comprising:
   (a) a plurality of biodegradable grape vine windings forming a generally spherical shaped structure;

(b) a nesting material of alpaca fleece removably inserted between the plurality of biodegradable grape vine windings to extend outwardly therefrom to substantially fully cover the generally spherical shaped structure to give a generally uninterrupted surface; and
(c) a rope attached to the structure for freely hanging the receptacle from an outdoor structure, whereby birds are able to perch on the windings and to easily remove the alpaca fleece from the receptacle.

2. The receptacle of claim 1 wherein the nesting material is selected from various shades of brown, black, tan, and white alpaca fleece for providing a camouflaged color to the receptacle.

\* \* \* \* \*